Jan. 20, 1959
P. AUTIO
2,869,723
ARTICLE SEPARATOR
Filed Oct. 28, 1954
2 Sheets-Sheet 1
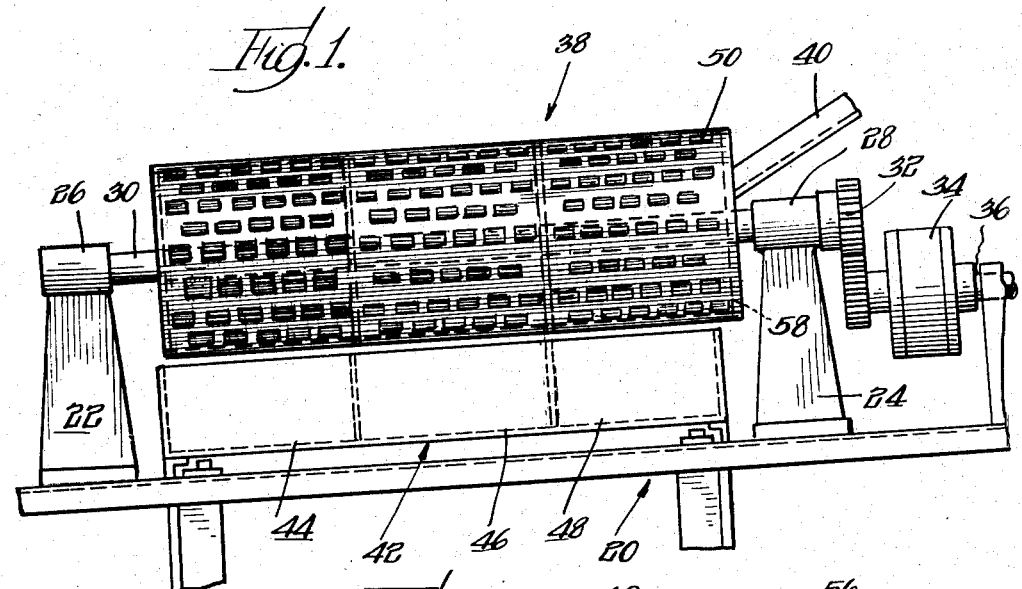
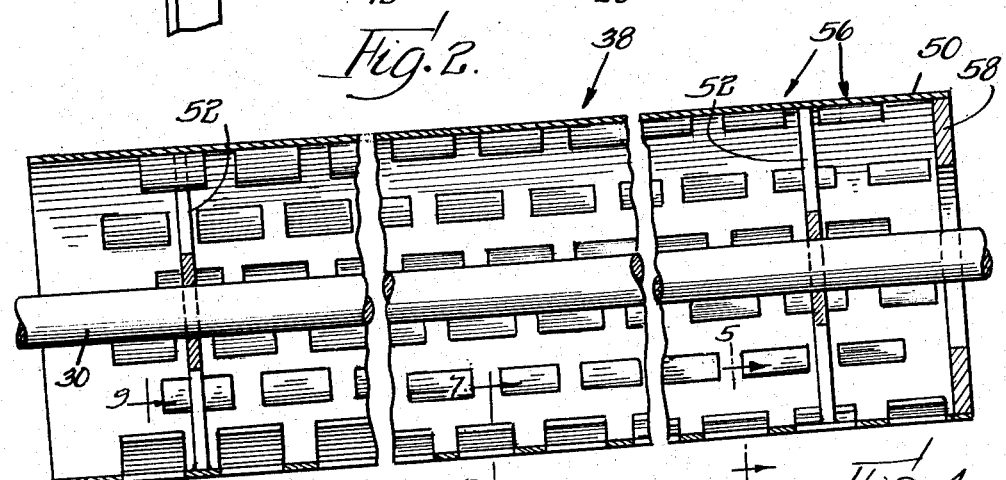
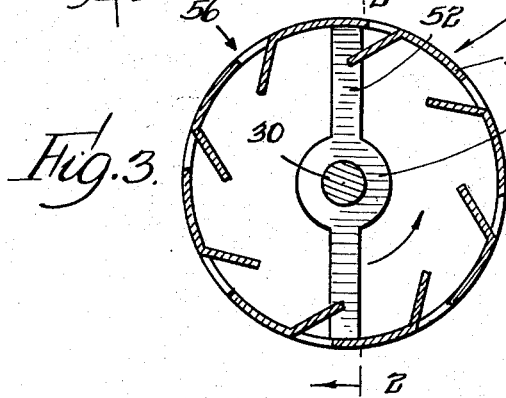
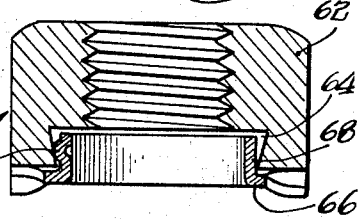
INVENTOR.
Paul Autio
BY:
Olson & Trexler
attys.

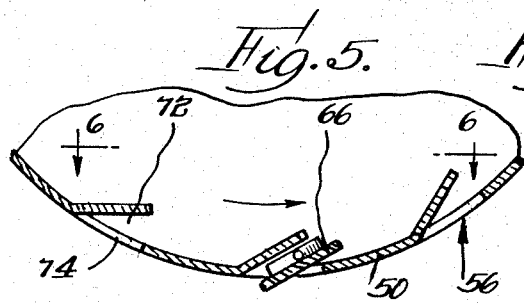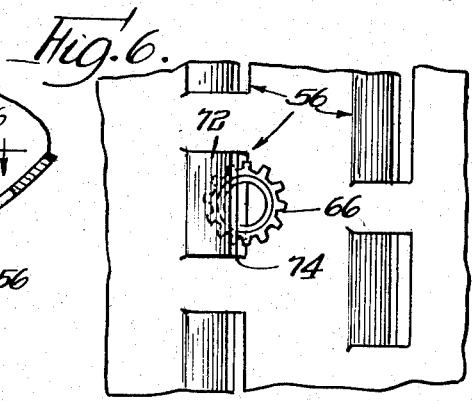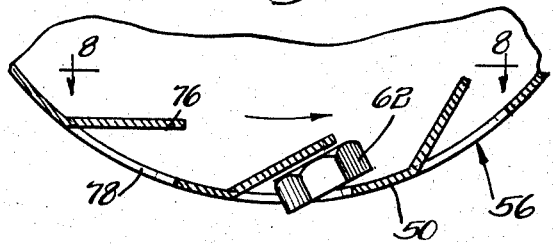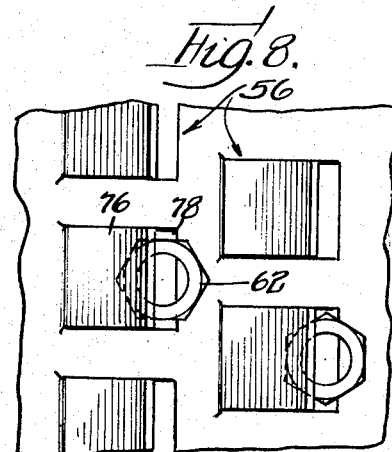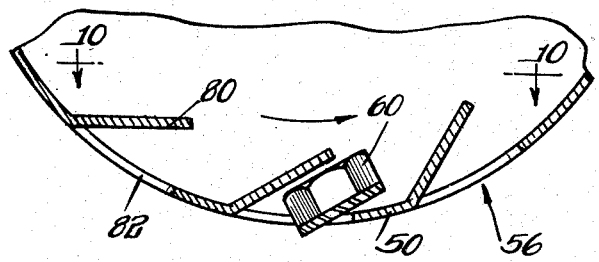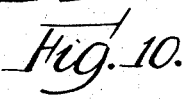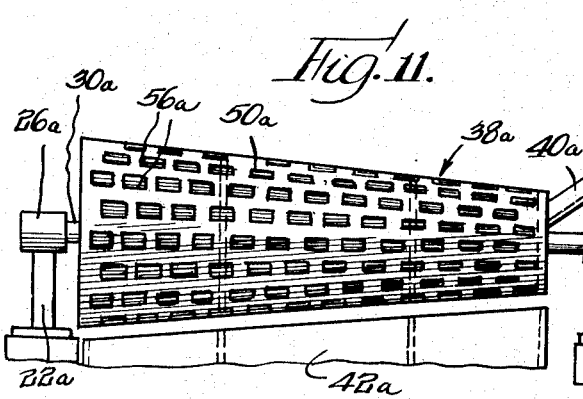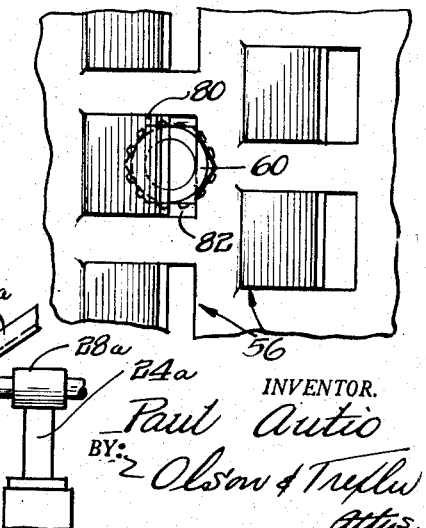

United States Patent Office 2,869,723
Patented Jan. 20, 1959

2,869,723

ARTICLE SEPARATOR

Paul Autio, Chicago, Ill., assignor to Illinois Tool Works, Chicago, Ill., a corporation of Illinois Application October 28, 1954, Serial No. 465,274

7 Claims. (Cl. 209—86)

This invention is concerned generally with an article handling mechanism, and more particularly with an apparatus for separating preassembled nut and lock washers from loose or improperly constituted assemblies.

Various types of assembly machines have been developed and are known in the art for preassembling lock washers with nut elements. Some of these machines attained a high degree of refinement, but failures in assembly still may occur due to nut elements or washers of improper size or faulty construction. Thus, in addition to the properly assembled nut elements and washers discharged from an assembly machine, there may be a certain number of loose nut elements, a certain number of loose washers, and a certain number of assemblies which are not properly held together, or which have not been secured together in proper orientation. Obviously, it is undesirable to ship out preassembled nut elements and lock washers with defective assemblies and loose nut elements and lock washers mixed in among them.

Accordingly, it is an object of this invention to provide an improved separator for separating the properly assembled nut elements and washers from those which are not properly assembled.

It is a further object of this invention to provide such a separator which is of simple and economical construction, and which has a minimum of moving parts, thereby having a long and trouble-free service life.

More specifically, it is an object of this invention to provide a separator of the foregoing character wherein the separating mechanism is of one piece construction.

It also is an object of this invention to provide a separator for separating properly assembled nut elements and lock washers from those which are not properly assembled which presents no danger to an attendant or an operator.

A further object of this invention is to provide an apparatus for separating properly assembled nut elements and washers from improper assemblies by positively directing the proper and improper assemblies through openings of a proper size to admit such articles.

Yet another object of this invention is to provide an apparatus for separating properly assembled nut elements and washers from defective assemblies wherein the operating mechanism is made of sheet metal.

Other and further objects and advantages of the present invention will be apparent from the following description when taken in connection with the accompanying drawings, wherein:

Fig. 1 is a side view of an apparatus constructed in accordance with the principles of my invention;

Fig. 2 is a longitudinal sectional view through the separating mechanism;

Fig. 3 is a cross-sectional view through the separating mechanism;

Fig. 4 is a longitudinal sectional view of an assembled lock washer and nut element which might be handled by the apparatus disclosed herein;

Fig. 5 is a cross-sectional view of the separator mechanism taken substantially along the line 5—5 of Fig. 2;

Fig. 6 is a fragmentary plan view as taken substantially along the line 6—6 in Fig. 5;

Fig. 7 is a cross-sectional view taken substantially along the line 7—7 in Fig. 2;

Fig. 8 is a fragmentary view taken substantially along the line 8—8 in Fig. 7;

Fig. 9 is a cross-sectional view taken substantially along the line 9—9 in Fig. 2;

Fig. 10 is a view taken substantially along the line 10—10 in Fig. 9; and

Fig. 11 is a side view of a modified form of the apparatus.

Referring now in greater particularity to the figures, and particularly to Figs. 1–3, there will be seen a support or pedestal 20 inclined slightly to the horizontal. By way of illustration the top of the pedestal may form an angle of substantially 4° with the horizontal. A pair of standards 22 and 24 upstand from the pedestal and are provided at their upper ends with bearings 26 and 28 respectively, the bearings being of any known or suitable construction. A shaft or axle 30 is journaled in these bearings, the bearings being in axial alignment with one another, and the shaft extends slightly beyond one of the bearings, preferably the bearing 28, for attachment to driving means which may comprise gears 32, a friction clutch 34, and a drive shaft 36.

A selector unit or mechanism 38 is arranged for rotation on the shaft 30 concentric therewith, and a feed chute 40 is provided at the upper end of the mechanism near the bearing 28 for supplying assemblies to the selector or separator mechanism for treatment thereby. A receiver 42 is supported on the pedestal 20 directly beneath the selector or separator mechanism 38 and is divided into three compartments, a compartment 44 for receiving properly assembled lock washers and nut elements, a compartment 46 for receiving loose nut elements, and a compartment 48 for receiving loose washers. It will be understood that the three compartments of the receiver 42 could constitute three separate receivers or receptacles, and that in place of the compartments there might be provided feed chutes or conveyors to carry the articles dropped thereinto to a more or less distant location.

The selector or separator unit or mechanism 38 comprises a sheet metal cylinder 50. In a specific exemplary embodiment of my invention, the cylinder is made of 1/16 inch thick steel which may be either cold rolled steel or hot rolled steel. The cylinder is made from a piece of flat sheet metal stock 16 by 32 inches, and is formed into a cylinder slightly over 5 inches in diameter, being welded upon an element thereof to form a seam which is continuous from one end to the other. A pair of spokes 52 having enlarged central sections 54 is welded diametrically across the cylinder near the opposite ends thereof, the enlarged central portions 54 being apertured and receiving the shaft or axle 30 which can be welded in place positively to insure rotation of the cylinder with the shaft or axle. The cylinder is provided substantially throughout its length and throughout its circumference with a plurality of punched-out tongues and corresponding openings indicated generally at 56. These tongues and openings are of three different sizes as will be explained shortly with reference to Figs. 5–10. The separator mechanism is completed by a flat sheet metal ring 58 fitting in the upper end of the cylinder and welded thereto. In the specific illustrative embodiment of the invention heretofore referred to, the ring is 1/8 inch thick, has a 5 1/16 inch outside diameter and a 3 inch inside diameter, and is tack welded to the cylinder at six points which preferably are equally arcuately spaced. The spokes 52 previously referred to are spaced in 2 3/16 inches from the ends of the cylinder.

Before referring to the details of the punched-out tongues and corresponding slots 56 and the operation of the apparatus, it will be helpful to refer to Fig. 4 for an illustration of the type of article to be selected or separated by the apparatus. In Fig. 4 there is shown a preassembled nut and lock washer 60. The nut 62 is of the type having a recess 64 which flares outwardly internally of the nut so as to have a smaller dimension at the clamping face than at the inside of the recess or counterbore 64. The lock washer 66 is of the twisted tooth type, and is provided with a generally axially extending internal skirt or flange 68 which projects into the recess or counterbore 64 of the nut. The skirt may be flared outwardly slightly or it may be provided with arcuately spaced protuberances 70 whereby the nut and washer can be stamped together axially and will remain in permanently assembled relation in the position shown. In order to obtain effective locking action, the lock washer is rotatable relative to the nut element, but cannot be separated from the nut element other than by positive efforts to effect such separation. It will be appreciated that many of the assemblies 60 discharged from an assembling machine will be properly assembled as shown in Fig. 4. However, in certain instances due to improper configuration or dimensions of the nuts and the washers, or due to other factors, the nuts and washers might be canted relative to one another, thus giving them an increased height, or they might not be assembled in such manner that they would stay together. Furthermore, a certain number of nuts and a certain number of washers which are not assembled at all may be discharged from an assembling machine.

The separator mechanism 38 including the cylinder 50 is rotated in a counterclockwise direction as viewed in Figs. 3, 5, 7, and 9 by the drive parts heretofore described. Perfect and defective assemblies, and also loose nuts and lock washers are dropped into the upper end of the cylinder from the chute 40, which chute may be supplied from an assembling machine or from any other convenient source. The rotation of the cylinder combined with the slight inclination thereof tumbles the assemblies and other parts and gradually feeds them from the right hand end of the drum toward the left hand end as viewed in Fig. 1. It will be appreciated that the ring 58 prevents any assemblies or the like from piling up and passing out the upper end of the drum. The tumbling action separates any nuts and lock washers which are only loosely assembled practically as soon as they drop into the cylinder.

The tongues and associated slots 56 are of three different sizes as may be seen in Figs. 5–10. Those of the upper end of the cylinder are of a smaller size as may be seen in Figs. 5 and 6, while those shown in Figs. 7 and 8 near the center of the cylinder are of medium size, and those adjacent the discharge end of the cylinder are of the largest size as may be seen in Figs. 9 and 10.

The first series of punched openings and co-operating tongues 56 is of the smallest size and is positioned through the upper third of the cylinder. The tongues of this group are numbered 72 as may be seen in Figs. 5 and 6, while the associated openings are numbered 74. The holes or slots 74 are sufficiently wide to pass a loose lock washer 66, preferably being somewhat wider than the outside diameter of such a lock washer. The tongues 72 are turned in a sufficient distance to allow clearance for a lock washer 66 to slide through the associated opening as may be seen in Fig. 5. It will be appreciated that these tongues are directed in the direction of rotation of the cylinder, so that they actively scoop the loose washers into the openings, thus providing a marked improvement over ordinary screening processes. It will be apparent that the openings are too small to permit passage of loose nuts or of assembled nuts and washers. Accordingly, these latter articles are fed by the tumbling action of the cylinder and by gravity to the center section of the cylinder, comprising substantially one third of the axial length of the cylinder.

The openings and associated tongues in this central section are larger than in the upper section of the cylinder, being large enough for the tongues 76 to direct the loose nuts 62 through the openings 78. These openings and the clearance height as provided by the angle at which the tongues are bent inwardly will not permit passage of assembled nuts and lock washers, and these assemblies continue to move by gravity and the tumbling action of the cylinder to the final third of the cylinder. In this third of the cylinder, as may be seen in Figs. 9 and 10, the tongues 80 are bent farther into the interior of the cylinder, thereby to provide a greater clearance height so that the assemblies 60 will pass through the openings 82. The openings or slots 78 and 82 can be of identical size in which case the tongues 80 are bent at a sharp angle into the interior of the cylinder as previously has been indicated, or the openings 82 can be made somewhat larger than the openings 78 so that the angle need not be increased.

The speed of rotation is sufficient to cause tumbling of the articles, and this tumbling action is enhanced by the tendency of the various fingers or tongues to carry the articles upwardly. However, the speed is sufficiently slow to allow the articles readily to drop through the proper openings. In the specific illustrative embodiment of the invention heretofore referred to, the speed of rotation would be on the order of 16 to 20 R. P. M.

In the illustrative example of my invention as heretofore shown and described, the axis of the cylinder was tilted in order to effect feeding of the articles from one end to the other. It will be understood that in addition to segregating the loose washers and nuts and the perfect assemblies as has been described heretofore, the few imperfect assemblies in which the nut is canted on the washer, or is otherwise defective, will not pass through any of the openings, but will continue on out the lower end of the cylinder. A suitable receptacle or other receiving means can be provided at the end of the cylinder for such defective assemblies, although none has been shown in the drawings.

It may sometimes be considered to be inconvenient to tilt the selector cylinder in the manner heretofore disclosed. This can be obviated in a manner shown in Fig. 11 by forming the separator 38a in the form of a truncated cone 50a. In this instance, the axle or shaft 39a remains horizontal, being journaled in aligned bearings 26a and 28a carried by upright standards 22a and 24a. A feed chute 40a similar to that previously described is utilized for gravitationally feeding articles into the small end of the frusto-conical separator. It will be understood that the punched-out tongues and cooperating openings 56a remain as before, being distributed similarly, and being of substantially the same size. The separated articles fall into a receiver 42a. The only difference between the embodiments of the invention shown in Figs. 1 and 11 is in the tilting of the axis of the first form as opposed to that of the second form, and the cylindrical configuration of the separator of the first form as compared to the frusto-conical configuration of the separator of the second form.

Thus, it will be seen that as long as the generatrix or element of the separator substantially vertically beneath the axis thereof is higher at the receiving end than at the discharge end, the separator may take the form of a cylinder, or a truncated cone, or some other figure having somewhat similar characteristics, and the axis thereof may be horizontal or inclined in accordance with the shape of the separator. In the absence of any well established generic term for a geometric figure of this type, I will refer to it as a hollow solid of revolution.

From the foregoing description it will be seen that the separator is of simple and economical construction, and is easy to fabricate. The cylinder, truncated cone, or other barrel comprising the separator preferably is of one piece construction and most simply is stamped from a flat sheet metal blank, and then is rolled to the desired shape and welded. The inwardly directed tongues or tabs serve as fingers to catch the articles, thereby facilitating feeding them through the slots or openings, and also enhancing the tumbling action. Since these tongues or tabs are bent inwardly, there is no danger to an operator or observer as there would be if the tongues were directed outwardly. This, coupled with the slip clutch, gives the operator a feeling of well-being since he knows that no harm can be done to him by the apparatus.

It is to be understood that the specific examples herein shown and described are for illustrative purposes only. Various changes in structure will no doubt occur to those skilled in the art, and will be understood as forming a part of this invention insofar as they fall within the spirit and scope of the appended claims.

I claim:

1. Apparatus for separating properly assembled washers and nut elements from improperly assembled washers and nut elements, comprising a hollow solid of revolution having a plurality of openings of different sizes spaced axially therealong selectively to pass properly assembled and improperly assembled washers and nut elements out of said hollow solid of revolution, each opening having a pair of substantially straight parallel edges extending substantially axially of said hollow solid, all of said openings being of the same dimension axially of said hollow solid of revolution, said hollow solid of revolution having a generating element thereof substantially vertically below the axis which is inclined slightly to the horizontal for feeding nut elements and washers along said hollow solid of revolution when the same is rotated about its axis, means for rotating said hollow solid of revolution about its axis to effect such feeding, and scoop means within said hollow solid of revolution adjacent each of said openings for directing properly and improperly assembled nut elements and washers to said openings, said scoop means being substantially flat and extended in the direction of rotation.

2. Separating apparatus as set forth in claim 1 wherein the scoop means comprise sheet metal fingers extending inwardly of said hollow solid from adjacent the trailing edges of the openings, and spaced from said hollow solid except adjacent said trailing edges.

3. Separating apparatus as set forth in claim 2 wherein the fingers are of rectangular configuration, being attached to the hollow solid of revolution along one edge and having the other edges free.

4. Separating apparatus as set forth in claim 2 wherein the hollow solid of revolution is of sheet metal construction, and wherein the fingers are punched from the surface thereof to provide said openings.

5. Separating apparatus as set forth in claim 4 and further including a flat ring secured within the end of said hollow solid of revolution perpendicular to the axis thereof and at the end where the generating element inclined to the horizontal is at the highest.

6. Separating apparatus as set forth in claim 4 wherein the rotating means includes a shaft, means supporting said shaft for rotation, and a plurality of spokes mounting said hollow solid of revolution on said shaft for rotation therewith.

7. Apparatus for separating properly assembled washers and nut elements from defective assemblies and loose nut elements and washers comprising a hollow solid of revolution, said hollow solid being of one piece sheet metal construction rolled into said hollow solid and having the edges brought into substantial engagement and secured to one another to form an elemental seam, said hollow solid of revolution having substantially flat, rectangular tongues struck therefrom into the interior thereof and attached along only one edge, said struck out tongues being spaced circumferentially about said hollow solid of revolution, and said tongues having variations in size and angular disposition from one end to the other of said hollow solid of revolution providing different size rectangular clearance openings for respectively passing loose washers, loose nut elements, and assembled washers and nut elements from said hollow solid of revolution, means for supporting said hollow solid of revolution with its longitudinal axis generally horizontal and with a generating element substantially vertically spaced below said axis which is inclined slightly from the horizontal whereby gravitationally to feed washers, nut elements, and assembled washers and nut elements from one end of said hollow solid of revolution toward the other end, means for introducing assembled and loose washers and nut elements into said hollow solid of revolution at the end where said generating element is the highest, and means for rotating said hollow solid of revolution about its axis to effect such feeding and to effect passage of the assembled and loose nut elements and washers selectively through the clearance openings, said fingers being directed generally in the direction of rotation of said hollow solid of revolution to scoop the assembled and loose nut elements and washers into the clearance openings.

References Cited in the file of this patent

UNITED STATES PATENTS

| | | |
|---|---|---|
| 453,185 | Geschwender | June 2, 1891 |
| 917,240 | Beymer | Apr. 6, 1909 |
| 1,143,231 | Schaefer | June 15, 1915 |
| 2,374,948 | Niederer et al. | May 1, 1945 |
| 2,714,214 | Stern | Aug. 2, 1955 |
| 2,716,487 | Cox | Aug. 30, 1955 |